H. E. HARDER.
PRESSURE GAUGE.
APPLICATION FILED APR. 7, 1919.
1,421,774.
Patented July 4, 1922.
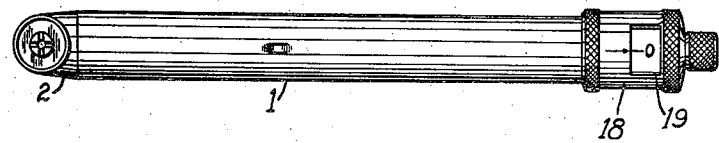
Fig. I
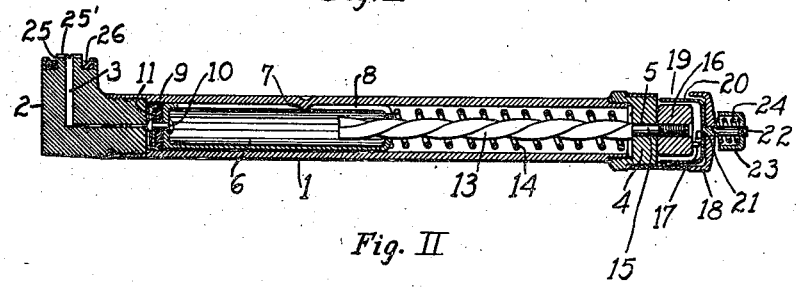
Fig. II
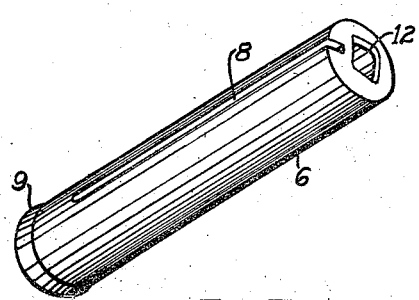
Fig. III
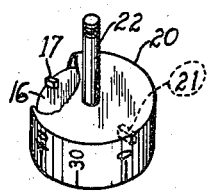
Fig. IV
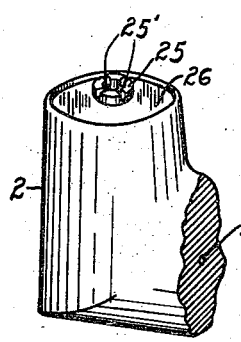
Fig. V
INVENTOR.
Harry E. Harder
BY
Knight Cook
ATTORNEYS

UNITED STATES PATENT OFFICE.

HARRY E. HARDER, OF ST. LOUIS, MISSOURI, ASSIGNOR OF ONE-HALF TO WILLIAM F. LESCHEN, OF ST. LOUIS, MISSOURI.

PRESSURE GAUGE.

1,421,774.     Specification of Letters Patent.     Patented July 4, 1922.

Application filed April 7, 1919. Serial No. 288,150.

*To all whom it may concern:*

Be it known that I, HARRY E. HARDER, a citizen of the United States of America, a resident of the city of St. Louis, in the State of Missouri, have invented certain new and useful Improvements in Pressure Gauges, of which the following is a full, clear, and exact description, reference being had to the accompanying drawings, forming a part of this specification.

My invention relates to a pressure gauge for registering the pressure of air or other fluids confined in a chamber, the device being more particularly intended for use in indicating the pressure of air in pneumatic tires by application to the valve stems of the tires.

Fig. I is an elevation of my gauge.

Fig. II is a longitudinal section through the gauge.

Fig. III is an enlarged perspective view of the plunger movable longitudinally in the gauge barrel.

Fig. IV is a perspective view of the scale member of the gauge, said member being partly borken away to show a portion of the tumbler by which the scale member is actuated.

Fig. V is an enlarged perspective view of the inlet end of the gauge.

In the drawings, 1 designates a barrel of my gauge at the rear end of which is an inlet member 2 containing a duct 3, through which air or other fluid may enter the barrel. At the forward end of the barrel is a head 4 containing a central aperture 5.

6 designates a hollow plunger movable longitudinally in the barrel 1 and held from rotation therein by a detent 7 projecting from the barrel and occupying a groove 8 extending longitudinally of the plunger (see Figs. II and III). An airtight packing is provided at the rear end of the plunger 6, said packing being perferably in the form of a cup leather 9 secured to the plunger by a pin 10 and a washer 11, which are adapted to contact with the inner end of the fluid inlet member 2 when the plunger moves rearwardly, thereby avoiding injury of the cup leather 9. The plunger 6 is provided at its forward end with a non-circular opening 12.

13 designates a spiral rod extending longitudinally within the barrel of the gauge and operable through the non-circular opening 12 at the forward end of the plunger 6. This spiral rod engages the walls of said opening 12, and due to such engagement rotation is imparted to it during the longitudinal movement of said plunger. The plunger 6 is adapted to be moved forwardly from its normal position at the rear of the barrel by air pressure directed against the packing at the rear end of the plunger, and said plunger is restored to its normal position by a spring 14 interposed between the front end of the plunger and the head 4 at the forward end of the gauge barrel.

The spiral rod is provided at its front end with a cylindrical stem 15, which extends loosely through the aperture 5 in the head 4 on the barrel 1, and which has fixed to it a driver or tumbler 16 rotatable with the spiral rod. The tumbler 16 carries an abutment lug 17 located at its forward end.

18 designates a hood fitted to the head 4, said hood being provided with a sight opening 19 located in its wall.

20 designates a cylindrical scale arranged within the hood 18 and having upon its periphery scale characters which may be viewed through the sight opening 19. A thrust receiving abutment lug 21, extending inwardly from the head of the scale 20, is adapted to receive the engagement of the lug 17 carried by the tumbler 16. The scale 20 is provided with a stem 22, which projects through the head of the hood 18, and is adapted to rotate in said head of said hood. Said stem 22 receives a cap nut 23 within which is a spring 24, interposed between the outer end of the cap nut and the head of the hood 18 and tending constantly to hold the head of the scale 20 in frictional engagement with the inner face of the hood. By adjustment of the cap nut on the stem 22 the tension of the spring 24 may be varied to increase or diminish the degree of frictional engagement between the scale and the head of the hood 18.

As hereinbefore mentioned, my pressure gauge is more particularly intended for indicating the presure of air in pneumatic tires. To adapt the gauge for such use the inlet member 2 is provided with a tubular boss 25, grooved transversely, and the opening therein communicates with the duct 3 in the inlet member. The boss 25 is surrounded by an annular yieldable seat 26 adapted to be presented to the nipple of a pneumatic valve stem, and when so presented the valve in said stem rests against the tubular boss 25, so that by pressure of the tubular boss against the valve, said valve will be unseated when the valve nipple is brought into contact with the yieldable seat 26. Air may then escape from the tire valve and pass through the transverse grooves 25′, and through the duct 3 into the gauge barrel 1.

In the particular use of my pressure gauge, the operation of the parts is as follows:

It should be first explained that the plunger 6 is normally in the retracted position in which it is seen in Fig. II, being yieldably in such position by the restoring spring 14.

The cylindrical scale 20 is first set to zero position, so that the zero sign appears at the sight opening 19, in the hood 18. This setting of the scale is performed by the operator grasping the cap nut 23 between the fingers, and turning it, thereby rotating the cylindrical scale by turning the stem 22 on which the cap nut is secured. By rotating the cylindrical scale in the proper direction the lug 21, carried by the head of said scale is brought into engagement with the lug 17 projecting from the end of the tumbler 16, and when these lugs are engaged, the zero sign on the scale is exposed through the sight opening 19.

Fluid under pressure, admitted to the barrel 1 through the duct 3, acts to force the plunger 6 forwardly against the resistance offered by the restoring spring 14. Inasmuch as said plunger is required to move in a longitudinal direction only, within the barrel 1, it necessarily imparts a rotative movement to the spiral rod 13 extending through the non-circular opening 12 in the plunger. The spiral rod in rotating imparts a similar rotation to the tumbler 16. The lug 21 on the head of the scale 20 being at this time in engagement with the lug 17 on the tumbler, said scale is rotated to a degree corresponding to the degree of rotation of the tumbler, and as a consequence, a character on the scale corresponding to the degree of pressure admitted to the gauge is brought to view at the sight opening 19 in the hood 18. During the actuation of the scale 20 in the manner explained, said scale is restrained from sudden movement due to the spring 24 serving to hold the head of the scale in frictional engagement with the inner face of the head of the hood 18 so that there is no opportunity for the excessive movement of the scale, due to sudden impulse of fluid pressure against the plunger when fluid is admitted to the gauge barrel.

When the pressure in the barrel 1 is relieved, the plunger 6 and tumbler 16 will be returned by the action of the restoring spring 14, and the lug 17 on the tumbler is thus returned to its starting position. However, the scale 20 will be held in the indicating position until it is restored by operation of the cap 23.

I claim:

1. A pressure gauge comprising a barrel, a rotatable pressure indicator having a thrust-receiving abutment, a rotary driver having an abutment adapted to engage said thrust-receiving abutment on but one side to transmit rotary movement in only one direction to said rotatable indicator, said rotary driver being movable in the opposite direction independently of said indicator, a spiral member operatively connected to said driver and extending longitudinally of said barrel, and a fluid actuated plunger located in said barrel and cooperating with said spiral member to impart rotary movement to said driver.

2. A pressure gauge comprising a barrel, a rotatable pressure indicator having a thrust-receiving abutment, a rotary driver having an abutment adapted to engage said thrust-receiving abutment on but one side to transmit rotary movement in only one direction to said rotatable indicator, said rotary driver being movable in the opposite direction independently of said indicator, a spiral member operatively connected to said driver and extending longitudinally of said barrel, a fluid actuated plunger located in said barrel and cooperating with said spiral member to impart rotary movement to said driver, means whereby said rotatable indicator is yieldingly held in its indicating position, and a restoring spring cooperating with said spiral member and plunger to restore said rotary driver independently of said rotatable indicator.

3. A pressure gauge comprising a barrel, a rotary driver having an abutment, a rotary indicator having a thrust-receiving abutment in the path of the first mentioned abutment, said abutments causing the rotary driver to transmit movement in only one direction to said rotary indicator, a fluid actuated piston located in said barrel, a spiral member whereby said piston transmits rotary motion to said driver, a restoring spring whereby said piston and rotary driver are restored independently of said rotary indicator, and a means whereby said rotary indicator is yieldingly held in its indicating position.

4. A pressure gauge comprising a barrel, a rotary driver having an abutment, a rotary indicator having a thrust-receiving abutment in the path of the first mentioned abutment, said abutments causing the rotary driver to transmit movement in only one direction to said rotary indicator, a fluid actuated piston located in said barrel, a spiral member whereby said piston transmits rotary motion to said driver, a restoring spring whereby said piston and rotary driver are restored independently of said rotary indicator, a manually operated restoring member whereby said rotary indicator is restored, and a spring tending to prevent rotation of said rotary indicator.

5. A pressure gauge comprising a barrel, a rotatable indicator at one end of said barrel, a rotary driver having an abutment adapted to engage and rotate said indicator, a spiral rod in said barrel to which said driver is operatively connected, a plunger in said barrel fitted to said spiral rod to impart rotation thereto during movement of the plunger longitudinally of the barrel, and a restoring spring whereby said plunger is returned to normal position.

6. A pressure gauge comprising a barrel, a rotary driver at one end of said barrel, pressure actuated means including a rotary member in said barrel whereby said rotary driver is turned, a spring whereby said pressure actuated means and driver are restored, a hood on said barrel, a rotatable scale within said hood, said scale and rotary driver being provided with cooperating abutments providing for the rotation of said scale in only one direction in response to rotation of said driver, said hood being provided with a sight opening through which said scale may be observed, said scale being rotatable independently of said driver and said abutments serving to limit such independent rotation.

7. A pressure gauge comprising a barrel, a rotary driver at one end of said barrel, rotary operating means in said barrel, a hood partially enclosing said rotary driver and within which it rotates, a scale rotatably mounted in said hood, and a spring whereby said scale is held in frictional engagement with said hood, said driver and scale having cooperating lugs whereby the scale is turned in only one direction.

8. A pressure gauge comprising a barrel, a tumbler at one end of said barrel, tumbler operating means in said barrel operable in response to fluid pressure, a hood fitted to said barrel, a cup-shaped rotatable scale within said hood operable by said tumbler, said hood being provided with a sight opening through which said scale may be viewed, a stem extending from the head of said scale through the head of said hood, a cap on said stem, and a spring interposed between said cap and said hood, whereby the head of said scale is held in frictional engagement with the head of said hood.

In testimony that I claim the foregoing I hereunto affix my signature.

HARRY E. HARDER.